(12) United States Patent
Wernze et al.

(10) Patent No.: US 11,829,909 B2
(45) Date of Patent: Nov. 28, 2023

(54) ROUTE FINDER FOR INTEGRATED PLANNING

(71) Applicant: SAP SE, Walldorf (DE)

(72) Inventors: Frank Wernze, Berneck (CH); Gerhard Schick, St. Ingbert (DE)

(73) Assignee: SAP SE, Walldorf (DE)

( * ) Notice: Subject to any disclaimer, the term of this patent is extended or adjusted under 35 U.S.C. 154(b) by 359 days.

(21) Appl. No.: 17/091,956

(22) Filed: Nov. 6, 2020

(65) Prior Publication Data

US 2022/0147886 A1    May 12, 2022

(51) Int. Cl.
| | |
|---|---|
| *G06Q 10/047* | (2023.01) |
| *G06F 16/9537* | (2019.01) |
| *G06F 16/29* | (2019.01) |
| *G01C 21/34* | (2006.01) |
| *G06Q 10/0631* | (2023.01) |
| *G06Q 10/0835* | (2023.01) |
| *G06Q 30/0204* | (2023.01) |

(Continued)

(52) U.S. Cl.
CPC ....... *G06Q 10/047* (2013.01); *G01C 21/3423* (2013.01); *G01C 21/3446* (2013.01); *G06F 16/29* (2019.01); *G06F 16/9537* (2019.01); *G06Q 10/06312* (2013.01); *G06Q 10/08355* (2013.01); *G06Q 30/0205* (2013.01); *G06Q 30/0635* (2013.01); *G06Q 50/30* (2013.01)

(58) Field of Classification Search
CPC .......... G06Q 10/047; G06Q 10/06312; G06Q 10/08355; G06Q 30/0205; G06Q 30/0635; G06Q 50/30; G06F 16/9537; G06F 16/29; G01C 21/3423; G01C 21/3446

USPC .......................................................... 701/42
See application file for complete search history.

(56) References Cited

U.S. PATENT DOCUMENTS

| | | | |
|---|---|---|---|
| 9,726,502 B2 | 8/2017 | Ni et al. | |
| 10,049,338 B2 | 8/2018 | Pillai et al. | |
| 10,464,106 B1 * | 11/2019 | Mo ........................ | B65G 67/20 |

(Continued)

FOREIGN PATENT DOCUMENTS

| | | |
|---|---|---|
| CA | 3000456 A1 | 4/2017 |
| CN | 101853294 B | 12/2011 |

(Continued)

OTHER PUBLICATIONS

Translation of WO-2019009414-A1.*

(Continued)

*Primary Examiner* — Krishnan Ramesh
(74) *Attorney, Agent, or Firm* — Klarquist Sparkman, LLP

(57) ABSTRACT

Technologies are described for determining possible routes using pre-processing operations. The pre-processing operations determine possible routes from an origin location to a destination location by dynamically generating representations of the transportation networks at runtime. For example, the pre-processing operations can dynamically determine a geographic area, and/or multiple sub-areas, that covers the origin location and the destination location. Possible routes from the origin location to the destination location can then be determined using only those locations within the geographic area and/or sub-areas. The locations that make up the possible routes can be provided for route optimization that utilizes transportation schedules and/or additional transportation requirements.

21 Claims, 7 Drawing Sheets

(51) Int. Cl.
*G06Q 30/0601* (2023.01)
*G06Q 50/30* (2012.01)

(56) References Cited

U.S. PATENT DOCUMENTS

| | | | |
|---|---|---|---|
| 10,467,563 B1 * | 11/2019 | Mo | G06F 16/29 |
| 2001/0009031 A1 * | 7/2001 | Nitta | G06F 30/394 |
| | | | 716/129 |
| 2003/0014286 A1 | 1/2003 | Cappellini | |
| 2003/0167109 A1 | 9/2003 | Clarke et al. | |
| 2005/0006470 A1 | 1/2005 | Mrozik | |
| 2007/0299686 A1 | 12/2007 | Hu | |
| 2008/0294484 A1 | 11/2008 | Furman et al. | |
| 2010/0131431 A1 | 5/2010 | Esau et al. | |
| 2010/0250461 A1 * | 9/2010 | Arnold | G06Q 10/08 |
| | | | 705/333 |
| 2010/0287073 A1 | 11/2010 | Kocis et al. | |
| 2013/0151435 A1 | 6/2013 | Hocquette et al. | |
| 2014/0180958 A1 | 6/2014 | Arunapuram et al. | |
| 2014/0279661 A1 | 9/2014 | Zahn et al. | |
| 2015/0019384 A1 * | 1/2015 | Fabian | G06Q 30/0635 |
| | | | 705/26.81 |
| 2015/0142594 A1 | 5/2015 | Lutnick | |
| 2015/0166163 A1 | 6/2015 | Longson | |
| 2015/0248639 A1 | 9/2015 | Maney et al. | |
| 2016/0098677 A1 | 4/2016 | Kim | |
| 2017/0325068 A1 * | 11/2017 | Bertelli | H04Q 4/025 |
| 2017/0328725 A1 * | 11/2017 | Schlesinger | G01C 21/3492 |
| 2018/0047295 A1 | 2/2018 | Ricci | |
| 2018/0053229 A1 | 2/2018 | Bhatnagar et al. | |
| 2019/0259082 A1 | 8/2019 | Malewicz | |

FOREIGN PATENT DOCUMENTS

| | | | | |
|---|---|---|---|---|
| GB | 2544992 A * | 6/2017 | | G01C 21/343 |
| WO | WO 2012/112399 | 8/2012 | | |
| WO | WO-2019009414 A1 * | 1/2019 | | G01C 21/34 |
| WO | WO 2020/034044 | 2/2020 | | |

OTHER PUBLICATIONS

Santha, "Design and Development of Integrated Algorithm for Effective Multimodal Transportation," Chapter 2, 2. Multimodal Transportation, http://hdl.handle.net/10603/35999, pp. 28-63, Feb. 19, 2015.
Chen et al., "A Simulation Platform for Combined Rail/Road Transport in Multiyards Intermodal Terminals," *Journal of Advanced Transportation*, vol. 2018, 19 pages, Feb. 28, 2018.
Caris et al., "Decision Support in Intermodal Transport: A New Research Agenda," *Computers in Industry*, vol. 64, pp. 105-112, Jan. 6, 2013.
Madroñero et al., "A Review of Tactical Optimization Models for Integrated Production and Transport Routing Planning Decisions," *Computers & Industrial Engineering*, vol. 88, pp. 518-535, Jun. 22, 2015.
"Transportation Management Suite for Sage X3," http://x3-routeoptimizer.com/#features, 7 pages, Feb. 18, 2020.
Extended Search Report, European Patent Application No. 21206224.4, 10 pages (dated Mar. 18, 2022).
Extended European Search Report, European Patent Application No. 21200385.9, 8 pages, dated Mar. 18, 2022.
Teodor Crainic et al., "Synchronized multi-trip multi-traffic pickup & delivery in city logistics," Transportation Research Procedia, 12 (2016), pp. 26-39, 2016.
Abramowicz et al., "Towards a Service-Based Internet," Proceedings of the 4th European Conference, ServiceWave 2011, Poznan, Poland, Oct. 26-28, 2011, 354 pages, Springer.
Ning Sun et al., "A Global and Dynamic Route Planning Application for Smart Transportation," *IEEE, 2015 First International Conference on Computational Intelligence Theory, Systems and Applications*, pp. 203-208, Dec. 2015.

* cited by examiner

ROUTE FINDER FOR INTEGRATED PLANNING

BACKGROUND

Organizations often use route planning technologies to ship goods from one location to another. For example, route planning technologies can be used to plan shipment of goods between locations (e.g., cities) using various types of transportation networks, including rail networks, airline networks, ocean shipping networks, etc.

One approach that organizations take is to use a route planner that examines each of a number of possible routes in order to find the optimal route. While such an approach can produce good results (e.g., finding the optimal route for a given set of constraints), it can also be inefficient. For example, if the route planner considers all, or nearly all, possible routes for a large network, it may take a long time (e.g., a number of minutes or hours) to find the optimal route (e.g., optimal based on criteria such as time, cost, etc.). If the route planner takes a long time, its usefulness may be limited (e.g., it may not be practical to use it to find the optimal route, resulting in less than optimal routes being produced).

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various technologies are described herein for determining possible routes using pre-processing operations. For example, the technologies can comprise obtaining a data set defining a plurality of geographic locations, where each location is associated with a set of transportation services, and where each location is part of one or more transportation networks. The technologies can further comprise receiving a customer order, where the customer order comprises transportation requirements, the transportation requirements comprising an origin location and a destination location. The technologies can further comprise performing pre-processing operations for determining possible routes from the origin location to the destination location, where the pre-processing operations determine the possible routes by dynamically generating representations of the transportation networks at runtime. The pre-processing operations can comprise dynamically determining, at runtime, a geographic area that covers the origin location and the destination location, where the geographic area includes only those locations that are within the geographic area. The pre-processing operations can further comprise dynamically determining, at runtime, possible routes from the origin location to the destination location within the geographic area that satisfy the customer order and that use at least one of the transportation networks, and where the possible routes are identified by those locations within geographic area that make up the possible routes. The technologies can further comprise sending only those locations within the geographic area that make up the possible routes for route optimization, where one or more optimized routes are determined using only those locations within the geographic area that make up the possible routes, one or more additional transportation requirements, and one or more transportation schedules.

In some implementations, the pre-processing operations comprise filtering locations within the geographic area based at least in part on the transportation requirements. For example, locations within the geographic area that do not have specific transportation services or that are not part of a specific transportation network can be filtered out and not considered when determining the possible routes.

In some implementations, the pre-processing operations comprise determining a plurality of sub-areas of the geographic area. The plurality of sub-areas are in a sequence from the origin location to the destination location. Furthermore, the locations (e.g., the locations that are available for consideration as part of the possible routes, which could be filtered locations) within each sub-area are part of the same transportation network.

DETAILED DESCRIPTION

Overview

Figure 1:
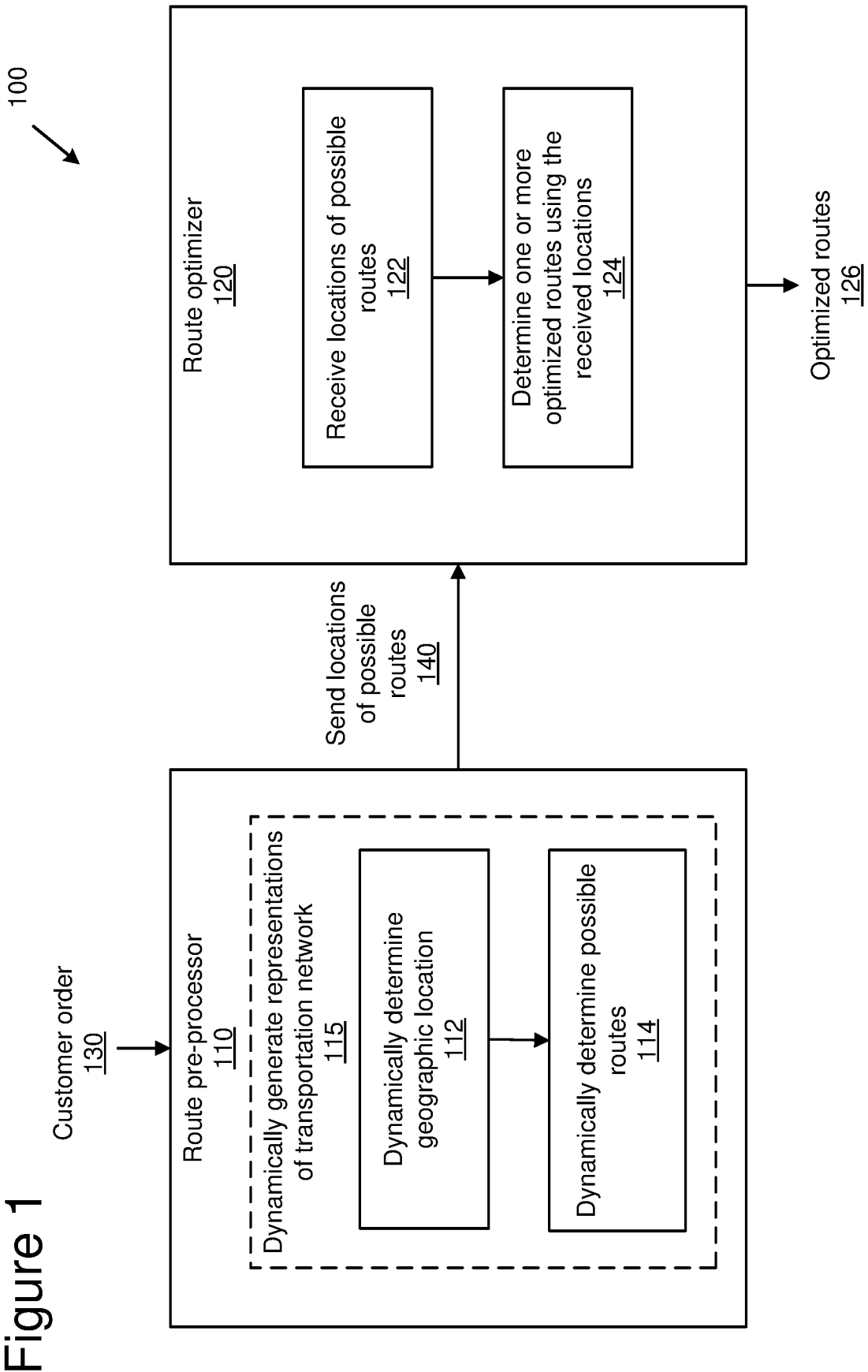
FIG. 1 is a diagram depicting an example environment for determining routes, including a route pre-processor that determines possible routes.

The following description is directed to technologies for determining possible routes within one or more transportation networks using pre-processing operations. The pre-processing operations determine the possible routes from a first location (e.g., an origin location) to a second location (e.g., destination location) (e.g., as defined by a customer order). In some implementations, instead of using static definitions of the transportation networks, the pre-processing operations determine the possible routes using dynamically generated representations of at least portions of one or more transportation networks. For example, the pre-processing operations can dynamically determine a geographic area that covers the origin location and the destination location. The pre-processing operations then dynamically determine possible routes from the origin location to the destination location using only those locations that are within the geographic area (and not any locations that are outside the geographic area). In some implementations, the pre-processing operations determine all possible routes from the origin location to the destination location that utilize those locations within the geographic area, which may also be filtered based on various transportation requirements (e.g., limited to locations that provide specific transportation services).

The locations that make up the possible routes are then processed (e.g., by a route optimizer) to determine optimal routes from only those locations that make up the possible routes (i.e., not considering locations that are not included in the possible routes).

The possible routes are determined from a number of locations (e.g., cities) that are part of one or more transportation networks. For example, a given transportation network can be defined by a set of locations that make up the transportation network (e.g., as a set of location tuples defining each connection of the transportation network). Each location is also associated with a set of transportation services.

In some implementations, the origin location and the destination location are defined by a customer order. For example, the customer order can be an order for a shipment (e.g., of goods) from the origin location to the destination location. The customer order can comprise transportation requirements, such as the origin and destination locations, transportation network requirements, cost requirements, etc.

Because only those locations that make up the possible routes are used for determining the optimized routes (e.g., are passed to the route optimizer), the route optimization process can be more efficient. For example, the pre-processing operations can determine possible routes for a specific source location and destination location that are within a geographic area (and/or within sub-areas). Furthermore, the pre-processing operations can consider fewer than all available transportation requirements when determining the possible routes (e.g., the pre-processing operations can use dynamically generated representations of portions of the transportation networks that do not consider requirements such as capacity, cost, and/or time transportation requirements). The pre-processing operations can pass just the locations that make up the possible routes for use in determining the optimized routes. In this way, the route optimizer does not have to consider all locations (e.g., all locations of one or more transportation networks), and all transportation requirements for all locations, when determining the optimized routes. Instead, the route optimizer can consider just those locations received from the pre-processing operations (e.g., from the route pre-processor), resulting in a smaller set of locations to evaluate. This results in a reduction in computing resource utilization by the route optimizer (e.g., reduced processor, memory, bandwidth, and/or storage resources). This also results in less overall time needed by the route optimizer to produce optimized routes (e.g., a reduction from minutes or hours to seconds).

In some previous solutions, the route optimizer analyzes routes using all, or nearly all, locations of a given transportation network (or given transportation networks) and using various transportation requirements (e.g., available capacity, delivery time, etc.) to come up with optimized routes. If the network of locations being analyzed is relatively large, the optimizer may take far too long to produce results (e.g., to determine optimized routes). To reduce the time needed to determine optimized routes, a route pre-processor can be implemented to determine possible routes using a smaller number of available locations (e.g., limited by geographic areas and/or sub-areas) and/or considering a smaller number of transportation requirements. For example, using a limited definition of the transportation networks (e.g., dynamically generated representations that indicate which locations are connected, via one or more transportation networks, to which other locations), possible routes can be determined by the pre-processor that are valid (e.g., possible routes that may provide transport from an origin location to a destination location, even though a portion of the possible routes may be knocked out by the optimizer based on the additional factors being considered, such as additional transportation requirements, transportation schedules, etc.).

In some previous solutions, the route optimizer is an existing (e.g., legacy) application that is difficult to modify. Using a route pre-processor in this situation can provide flexibility and efficiency to the overall route determination process. For example, the route pre-processor can be easily and quickly modified to determine possible routes using a limited number of locations and/or transportation requirements. Indications of the possible routes (e.g., just the locations used by the possible routes) can be passed to the route optimizer, which limits the effort needed by the route optimizer to determine optimized routes.

Locations

The technologies described herein are applied to finding routes between locations of transportation networks using pre-processing operations. As used herein, the term "location" refers to a geographic location. In some implementations, a location corresponds to a city. For example, a location can be identified by its city name and/or by another type of identifier (e.g., a unique identifier). In some implementations, a location is identified by geographic coordinates (e.g., latitude and longitude).

As used herein, locations (also referred to as network locations or established locations) are part of a transportation network (e.g., a location that has a rail terminal and is part of a specific rail transportation network and/or a location that has an airport and is part of a specific domestic airline transportation network). For example, a location can serve as an origin or a destination for a specific route. Some locations allow for a change in the type or mode of transportation (e.g., to switch between a train transportation network and an airline transportation network). In general, the routing described herein is performed between locations that are part of one or more transportation networks. However, in some implementations other types of locations can also be used by the routing technologies. For example, arbitrary locations (also referred to as non-network locations) are not part of a transportation network. An example of an arbitrary location is a location of a business that is not part of a defined transportation network (e.g., a rail transportation network with a set of defined rail terminal locations or an airline transportation network with a set of defined airport locations). An arbitrary location could be the pick-up location for a shipment (e.g., where the shipment is picked up from a business by a truck and delivered to a network location) and/or the delivery location for a shipment (e.g., where the shipment is delivered to a business address from a network location).

Each location is associated with a set of services (also referred to as transportation services). The set of services for a given location define the transportation options that are available at the given location. For example, a particular city may have specific types of railway services (e.g., rail station for passenger trains, rail station for freight transportation, rail station with locomotive repair services, delivery of containers to local customers, handling services for dangerous materials, etc.), specific types of ocean transportation services (e.g., ramps for container vessels), and specific types of air transportation services (e.g., airport for domestic flights, airport for international flights, military airport, etc.).

Transportation Networks

The technologies described herein are applied to finding routes within transportation networks using pre-processing operations. As used herein, a "transportation network" is a network for moving things (e.g., goods, people, etc.) from one location to another using a mode of transportation. Example transportation networks include railway networks (e.g., a fast train network, a freight train network, etc.), airline networks (e.g., domestic airline networks, international airline networks), ocean freight networks, etc. A given transportation network has a "type" or a "mode of transportation," which describes the type of transportation used by the transportation network (e.g., a rail transportation network, an airline transportation network, etc.).

A transportation network is comprised of a number of locations (e.g., cities). Each location of a transportation network is connected by a reference to at least one other location of the transportation network (e.g., which can be referred to as one or more predecessor locations and/or one or more successor locations). In some implementations, a transportation network is defined by a number of network location tuples, where each network location tuple represents a connection (also referred to as a stage) of two consecutive locations (i.e., that have no other locations between them).

In some implementations, transportation networks are defined in terms of their locations. For example, a given transportation network can be defined by all of the locations associated with the given transportation network. Furthermore, each location may be a member of one or more different transportation networks. For example, a specific city may have access to a fast train network, an international airline network, and a domestic airline network.

Each location can be associated with a set of transportation services. The transportation services can indicate which transportation network, or transportation networks, a given location is a part of. The transportation services can also indicate other transportation network services that are available at, or associated with, a given location. For example, a first location could have the following set of transportation services: freight train transportation network (indicating that the first location is part of the freight train transportation network), train repair facility (indicating that the first location has a train repair facility), etc. A second location could have the following set of transportation services: freight train transportation network (e.g., with no additional services), international airline transportation network (e.g., with additional services such as an airline repair facility and a customs facility), domestic airline transportation network, and an ocean cargo transportation network (e.g., with additional services such as container loading, customs facility, and dangerous goods handling).

A transportation network is associated with a schedule (also referred to as a transportation schedule). A schedule defines the service times (e.g., arrival and departure times) for a given transportation network. For example, a schedule for an international airline transportation network can comprise flight information (e.g., indicating when various flights arrive and/or depart the various locations of the international airline transportation network, as well as other scheduling attributes such as passenger and cargo capacity, special handling for certain flights, etc.) for one or more specific airline carriers that are part of the international airline transportation network.

Customer Orders

In the technologies described herein, customer orders are used to define, at least in part, transportation requirements that are used to identify possible routes and/or optimized routes. As used herein, the term "customer order" refers to any type of information that identifies and/or describes transportation (e.g., a shipment of goods, a person traveling, etc.) from one location (e.g., an origin location, which is an entry point to one or more transportation networks) to another location (e.g., a destination location, which is an exit point from one or more transportation networks). Customer orders can come in a variety of forms, including agreements, contracts, requests for quotes, and/or other types of documents. For example, a customer could generate a customer order to request a shipping proposal for shipping goods from an origin location to a destination location. The shipping proposal could comprise a proposed route (e.g., an optimized route), cost information, timing information (e.g., how long it will take to ship the goods to the destination location), etc.

In some implementations, a customer order defines transportation requirements comprising an origin location (e.g., a city or another type of location where the transportation, or route, begins) and a destination location (e.g., a city or another type of location where the transportation, or route, ends). A customer order can also define other types of transportation requirements. The other types of transportation requirements can include an indication of one or more transportation networks that are to be used. For example, the customer order could specify a shipment of goods using a rail network for a first leg of the route, followed by a domestic airline network for a second leg of the route, followed by a rail network for a third leg of the network. The other types of transportation requirements can include timing requirements, such as a drop off time (e.g., a date and/or time when the goods will be at the origin location ready for shipment), an arrival time (e.g., a date and/or time by which the shipment must arrive at the destination location), a transit time (e.g., a maximum amount of time for the shipment to arrive after leaving the origin location), and/or other timing requirements. The transportation requirements can also include special handling requirements (e.g., dangerous goods handling). The transportation requirements can also include shipping and/or delivery addresses or pricing requirements (e.g., a price range, or price limit, for transportation costs).

There are other types of transportation requirements that may, or may not, be defined by the customer order. In some implementations, transportation can include requirements that are specific to a given transportation network. For example, a freight rail transportation network can include transportation requirements such as locomotive requirements (e.g., locations where specific types of locomotives are available, etc.), crew requirements (e.g., locations where crew are available or locations where rest or stop-over is available), etc. Transportation requirements and/or services can also be grouped to make filtering more efficient.

In general, the transportation requirements (whether explicitly defined by the customer order, derived from the customer order, and/or obtained from other sources) can be used to filter locations that are available for determining possible routes. For example, pre-processing can include identifying the locations within a given geographic area and/or sub-area. The locations can be filtered based on the transportation requirements. The filtered locations can then be used to determine possible routes.

Environments for Determining Routes

FIG. 1 is a diagram depicting an example environment 100 for determining routes, including a route pre-processor that determines possible routes. The example environment 100 includes a route pre-processor 110. The route pre-processor 110 can be implemented by various software and/or hardware resources (e.g., comprising server resources, database resources, storage resources, software resources, etc.). In some implementations, the route pre-processor 110 is implemented by computer instructions running on one or more computer devices (e.g., server resources or cloud computing resources). For example, the route pre-processor 110 can be operated as service (e.g., as a cloud service) and as part of a transportation service (e.g., a service that manages transportation and logistics for organizations, such as the SAP® Transportation Management system).

The route pre-processor 110 receives a customer order 130. For example, the customer order 130 can be received from a remote computing device over the Internet. The customer order 130 can define various aspects of a transportation activity (e.g., a shipment of goods) from one location to another. For example, the customer order 130 can comprise an origin location, a destination location, and/or other transportation requirements.

The route pre-processor 110 performs various pre-processing operations to determine possible routes. The route pre-processor 110 dynamically generates representations of at least portions of one or more transportation networks, as indicated at 115. As depicted at 112, the pre-processing operations include dynamically determining a geographic area that covers the origin location that the destination location. In some implementations, the geographic area is determined as the smallest rectangular area that encompasses both the origin location and the destination location. In some implementations, the initial geographic area is analyzed to determine if it contains at least one possible route from the origin location to the destination location using only those locations within the initial geographic area. If it does, then the pre-processing operations proceed using the initial geographical area. If not, then the initial geographic area is incrementally increased in size until it does contain at least one route from the origin location to the destination location.

As depicted at 114, the pre-processing operations include dynamically determining possible routes from the origin location to the destination location (e.g., main network locations with assigned transportation services) within the geographic area determined at 112. The possible routes are determined from only the locations that are within the geographic area determined at 112 (e.g., which may be filtered based on transportation requirements), and not those locations that are outside the geographic area. The possible routes are identified by those locations within the geographic area that make up the possible routes. For example, each possible route can be identified by a sequence of location tuples. In some implementations, the pre-processing operations determine all possible routes from the origin location to the destination location within the geographic area determined at 112 (e.g., all possible routes that satisfy certain transportation requirements).

After the possible routes are determined, the route pre-processor 110 sends the locations that make up the possible routes to the route optimizer 120, as depicted at 140. The route pre-processor 110 sends only those locations that make up the possible routes to the route optimizer 120, and not other locations regardless of whether they are within or without the geographic area. In some implementations, the locations are processed into a format that is understandable by the route optimizer 120.

The example environment also includes the route optimizer 120. The route optimizer 120 can be implemented by various software and/or hardware resources (e.g., comprising server resources, database resources, storage resources, software resources, etc.). In some implementations, the route optimizer 120 is implemented by computer instructions running on one or more computer devices (e.g., server resources or cloud computing resources). For example, the route optimizer 120 can be operated as service (e.g., as a cloud service) and as part of a transportation service (e.g., a service that manages transportation and logistics for organizations, such as the SAP® Transportation Management system). The route optimizer 120 can run on the same computing resources as the route pre-processor 110 (e.g., as part of a combined service) or on different computing resources (e.g., as part of a separate or distributed service).

The route optimizer 120 performs various operations to determine optimized routes. As depicted at 122, the locations of the possible routes are received from the route pre-processor 110. As depicted at 124, the route optimizer 120 determines one or more optimized routes using the locations of the possible routes, and not considering locations that are not part of the possible routes. In other words, the route optimizer 120 only searches within the locations that make up the possible routes when determining the optimized routes. When determining the optimized routes, the route optimizer 120 does not have the consider the locations as part of any possible route. Instead, the route optimizer 120 considers the locations regardless of how they were used by the route pre-processor 110 to determine the possible routes. In fact, the route optimizer 120 does not consider the possible routes at all, just the locations that were sent by the route pre-processor 110.

While the route optimizer 120 does not consider locations that are not part of the possible routes, the route optimizer 120 does consider other information when determining the optimized routes. Specifically, the route optimizer 120 considers static definitions of the transportation networks, which include transportation schedules, when determining the optimized routes. The route optimizer 120 can also consider other transportation requirements (e.g., the same and/or different transportation requirements as those considered by the route pre-processor 110), such as cost, capacity, and/or time requirements.

The route optimizer 120 can output optimized routes, as depicted at 126. For example, the route optimizer 120 can provide one or more optimized routes to the customer that submitted the customer order 130 (e.g., for display within a transportation planning application).

Figure 2:
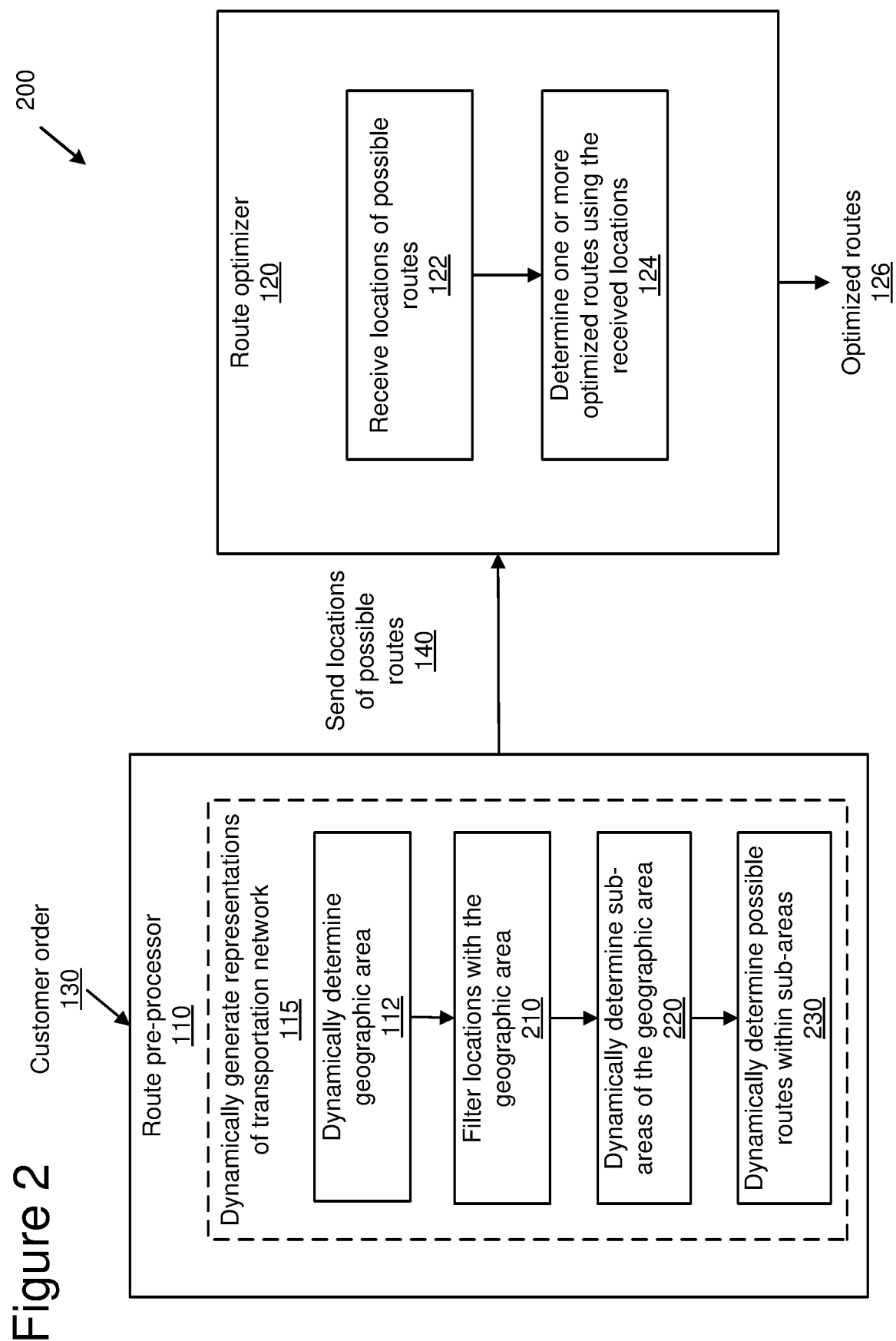
FIG. 2 is a diagram depicting an example environment for determining routes, including a route pre-processor that determines possible routes using geographic sub-areas.

FIG. 2 is a diagram depicting an example environment 200 for determining routes, including a route pre-processor that determines possible routes using geographic sub-areas. The example environment 200 is similar to the example environment 100 depicted in FIG. 1, except for the pre-processing operations that are performed. Specifically, as depicted at 210, the locations within the geographic area are filtered. The filtered locations are then used when determining the possible routes within the sub-areas. The locations can be filtered based on one or more transportation requirements. For example, the customer order could specify that certain transportation networks and/or modes of transportation are to be used. As another example, filtering could be performed based on intrinsic transportation requirements of a given transportation network (e.g., a locomotive may need maintenance at certain intervals, so a location that has a locomotive repair facility may be required at certain locations within the possible routes).

As depicted at 220, the pre-processing operations dynamically determine a plurality of sub-areas of the geographic area determined at 112. The plurality of sub-areas are in a sequence from the origin location to the destination location. In other words, a first sub-area begins with the origin location and ends at an ending location of the first sub area, a second sub-area beings with the ending location of the first sub area and ends at an ending location of the second sub-area, and so on until the destination location is reached.

In some implementations, each sub-area uses one transportation network, which is different from the transportation networks used by adjacent sub-areas. For example, a first sub-area could use a freight train transportation network, a second sub-area could use a domestic airline transportation network, and a third sub-area could use an international airline transportation network. As another example, a first sub-area could use a freight train transportation network, a second sub-area could use a domestic airline transportation network, and a third sub-area (which is not adjacent to the first sub-area) could use the freight train transportation network. In this way, the mode of transportation is the same within a given sub-area, and transitions between sub-areas.

The sub-areas can be determined independently or in combination with determining the possible routes at 230. For example, the pre-processing operations can start with the origin location and a given transportation network (e.g., one of the available transportation networks, which could be filtered by the customer order and/or other transportation requirements) and proceed outward within the geographic area to connecting locations that are part of the given transportation network until an ending location is found (e.g., a location that does not provide a further connection via the given transportation network or that is otherwise determined to be the ending location based on transportation requirements). The origin location and ending location can form a first sub-area. The pre-processing operations can then proceed, starting with the ending location of the first sub-area and using a different given transportation network to create a second sub-area. This procedure can be repeated until a sub-area is generated that reaches the destination location. This procedure can also be used for each possible transportation network that is available at the origin location. For example, multiple different sets of sub-areas can be generated, each set representing a different sequence of transportation networks. In some implementations, all possible routes using all possible combinations of transportation networks are generated from the origin location to the destination location, which can traverse different sets of sub-areas. In some implementations, the sub-areas can be incrementally enlarged so that they include at least one possible route (e.g., using the same procedure as described with respect to incrementally enlarging a geographic area).

As depicted at 230, the pre-processing operations include dynamically determining possible routes from the origin location to the destination location within the geographic sub-areas determined at 220. The possible routes are determined from only the locations that are with the geographic sub-areas determined at 220 (and that have been filtered, as described at 210), and not those locations that are outside the geographic sub-areas. The possible routes are identified by those locations within the geographic sub-areas that make up the possible routes. For example, each possible route can be identified by a sequence of location tuples. In some implementations, the pre-processing operations determine all possible routes from the origin location to the destination location within the geographic sub-areas (e.g., all possible routes that satisfy certain transportation requirements). In some implementations, the pre-processing operations determine all possible routes from the origin location to the destination location within each of multiple sets of geographic sub-areas (e.g., all possible routes that satisfy certain transportation requirements).

After the possible routes are determined, the route pre-processor 110 sends the locations that make up the possible routes to the route optimizer 120, as depicted at 140. The route pre-processor 110 sends only those locations that make up the possible routes to the route optimizer 120, and not other locations regardless of whether they are within or without the geographic sub-areas. The route optimizer 120 then determines the optimized routes using the received locations, as described herein. In some implementations, the route optimizer 120 can use additional locations when determining the optimized routes. For example, the route optimizer 120 can consider transportation schedules, which could require certain locations to be included in a route (e.g., a specific location could be a required stop location for a certain train schedule).

Figure 3:
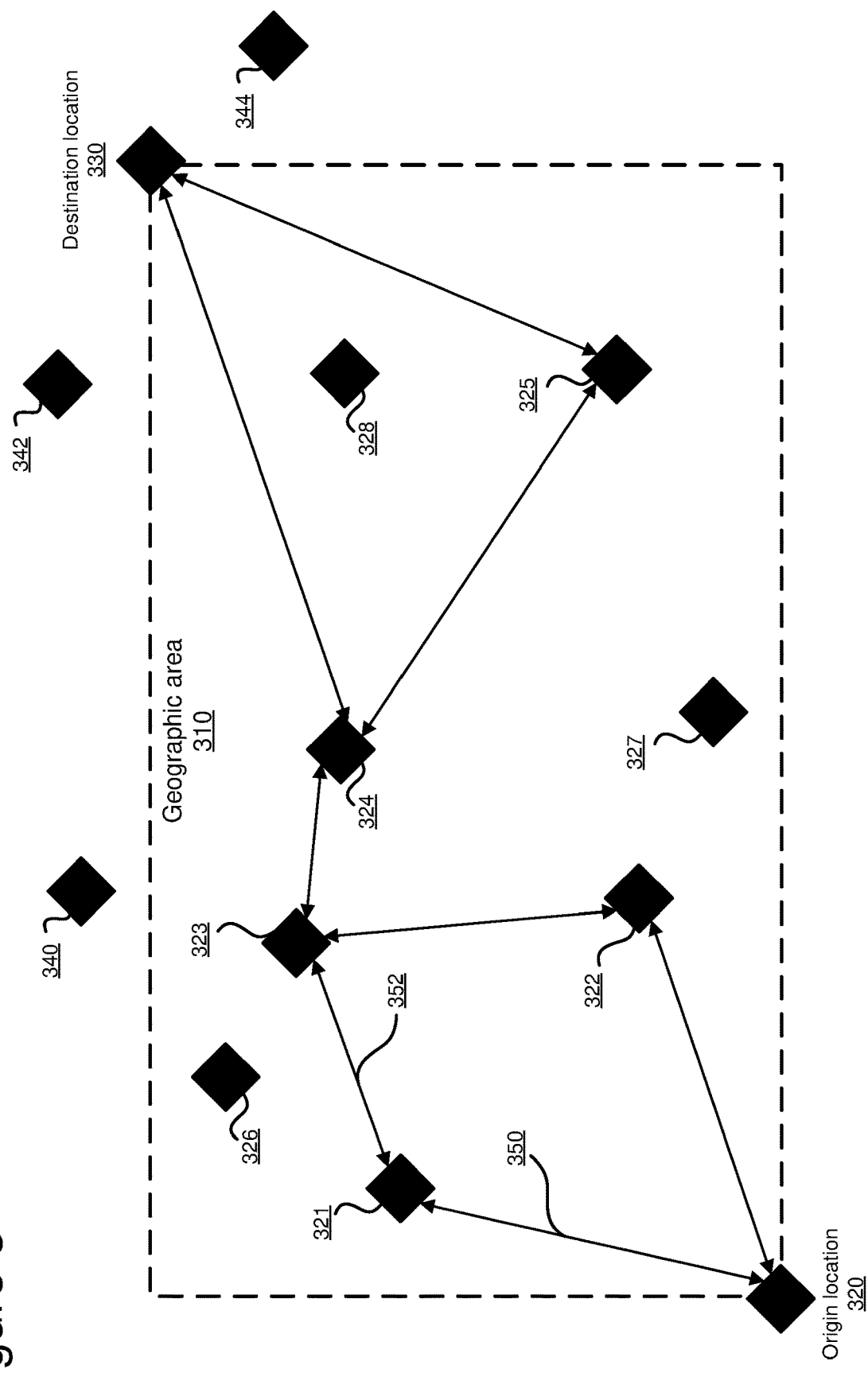
FIG. 3 is a diagram depicting an example geographic area in which pre-processing operations are performed to determine possible routes.

FIG. 3 is a diagram depicting an example geographic area 310 in which pre-processing operations are performed to determine possible routes. In FIG. 3, the diamond shapes represent locations (e.g., cities). One of the locations has been identified as the origin location 320 and another location has been identified as the destination location 330. For example, the origin location 320 and the destination location 330 can be identified by a customer order.

As part of the pre-processing operations, the geographic area 310 has been determined as the area that covers the origin location 320 and the destination location 330. In some implementations, the geographic area 310 is the smallest rectangular area that covers the origin location 320 and the destination location 330.

As illustrated by FIG. 3, the geographic area 310 divides the locations into those locations that are within the geographic area 310 (specifically, locations 320, 321, 322, 323, 324, 325, 326, 327, 328, and 330) and those locations that are not within (i.e., are outside) the geographic area 310 (specifically, locations 340, 342, and 344). The pre-processing operations use those locations that are within the geographic area 310 when determining the possible routes from the origin location 320 to the destination location 330.

In the example depicted in FIG. 3, the pre-processing operations have identified a number of possible routes. The possible routes are identified by dynamically generating representations of one or more transportation networks using those locations that are within the geographic area 310. For example, the transportation services of each of the locations within the geographic area 310 can be analyzed. Possible routes can then be built up using locations that have overlapping transportation services. For example, origin location 320 may be part of a freight train transportation network. The other locations within the geographic area 310 can be examined to determine which of them are also part of the freight train transportation network. For example, location 321 can be part of the freight train transportation network and have a connection 350 (e.g., one or more railway lines) to origin location 320, location 323 can be part of the freight train transportation network and have a connection 352 to location 321, and so on. Using the locations within the geographic area 310 and the transportation services associated with the locations, the possible routes can be generated, as reflected by the lines with arrows in FIG. 3.

In some implementations, the locations within the geographic area 310 are filtered based on one or more transportation requirements. For example, the locations can be filtered based on one or more transportation requirements that are specified by the customer order and/or from another source (e.g., transportation preferences provided by the customer). For example, the specific possible routes depicted in FIG. 3 could be the result of the customer order specifying that a freight train transportation network should be used. Taking this transportation requirement into account, the pre-processing operations would filter the locations so that only those locations within the geographic are 310 that are part of the freight train transportation network are considered. In this example, locations 326, 327, and 328 are not part of the freight train transportation network and therefore they are excluded from consideration.

In some implementations, the possible routes only use one transportation network. For example, if the one transportation network is a freight train transportation network, then only those locations within the geographic area 310 that are part of the freight train transportation network (e.g., locations 320, 321, 322, 323, 324, 325, and 330) are considered when determining the possible routes. As another example, if the one transportation network is a domestic airline transportation network, then only those locations within the geographic area 310 that are part of the domestic airline transportation network (e.g., locations 320, 324, 326, 327, 328, and 330) are considered when determining the possible routes. It should be understood that some locations can be part of more than one transportation network (e.g., locations 320, 324, and 330 could be part of the freight train transportation network and the domestic airline transportation network).

In some implementations, the possible routes can use one or more (e.g., multiple) transportation networks. For example, a possible route could use a first transportation network (e.g., a freight train transportation network) from origin location 320 to location 324 (passing through locations 321 and 323), and the use a second transportation network (e.g., a domestic airline transportation network) from location 324 to location 330 (e.g., passing through location 325).

In some implementations, the locations that are available for use within the geographic area 310 when determining the possible routes can be filtered based on other transportation requirements. For example, a freight train transportation network can have specific requirements regarding locomotives, crews, etc. Other transportation networks can have specific requirements as well.

In some situations, the origin location 320 and destination location 330 may represent the actual start and end points for the shipment. However, in other situations, there may be other modes of transportation involved either before the origin location 320 and/or after the destination location 330. For example, the shipment could actually begin in the same city as the origin location 320 (e.g., at an arbitrary location within the city) or at another location (e.g., an arbitrary location outside the geographic area 310) and arrive at the origin location 320 via a different transportation network (e.g., a trucking network that picks up goods from an arbitrary location within the same city as the origin location 320 or from an arbitrary location in another city and delivers the goods to a freight train terminal that is part of the transportation network being used within the geographic area 310). A similar situation can occur at the destination location 330.

In some implementations, the initial geographic area (e.g., geographic area 310) is analyzed to determine if it contains at least one possible route from the origin location 320 to the destination location 330 using only those locations within the initial geographic area. If it does, then the pre-processing operations proceed using the initial geographical area. If not, then the initial geographic area is incrementally increased in size until it does contain at least one route from the origin location to the destination location. For example, if there was no connection between locations 323 and 324, then the geographic area 310 could be expanded to encompass location 340 (assuming location 340 supports a possible route from the origin location 320 to the destination location 330).

Figure 4:
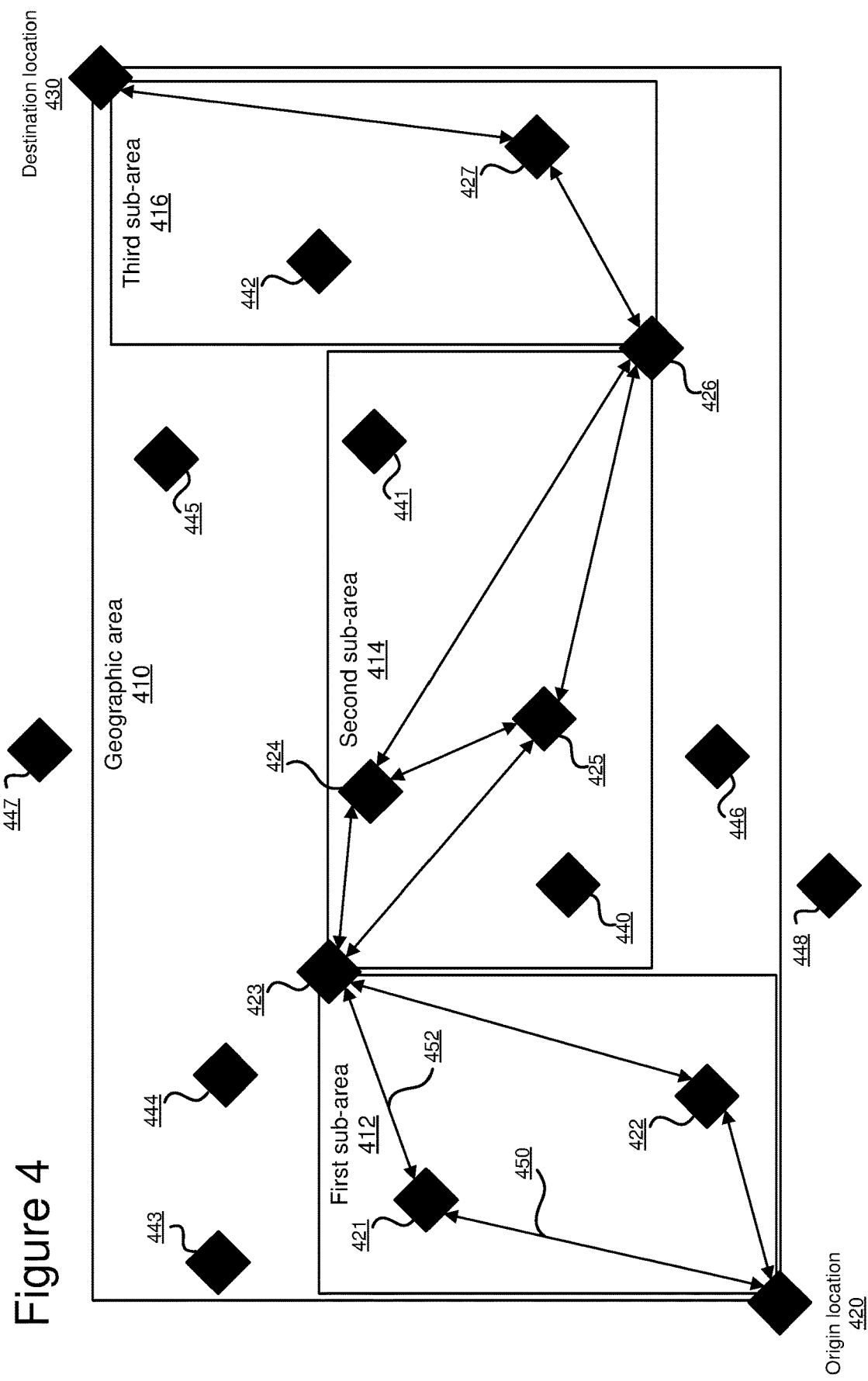
FIG. 4 is a diagram depicting an example geographic area, and sub-areas, in which pre-processing operations are performed to determine possible routes.

FIG. 4 is a diagram depicting an example geographic area 410, and sub-areas, in which pre-processing operations are performed to determine possible routes. In FIG. 4, the diamond shapes represent locations (e.g., cities). One of the locations has been identified as the origin location 420 and another location has been identified as the destination location 430. For example, the origin location 420 and the destination location 430 can be identified by a customer order.

As part of the pre-processing operations, the geographic area 410 has been determined as the area that covers the origin location 420 and the destination location 430. In some implementations, the geographic area 410 is the smallest rectangular area that covers the origin location 420 and the destination location 430.

As illustrated by FIG. 4, the geographic area 410 divides the locations into those locations that are within the geographic area 410 (specifically, locations 420, 421, 422, 423, 424, 425, 426, 427, 430, 440, 441, 442, 443, 444, 445, and 446) and those locations that are not within (i.e., are outside) the geographic area 410 (specifically, locations 447 and 448). The pre-processing operations use those locations that are within the geographic area 410 when determining the geographic sub-areas and subsequently the possible routes from the origin location 420 to the destination location 430.

In the example depicted in FIG. 4, the pre-processing operations have identified a plurality of geographic sub-areas. Specifically, three sub-areas have been identified: a first sub-area 412, a second sub-area 414, and a third sub-area 416. The possible routes within a given sub-area all use the same transportation network and/or mode of transportation. For example, locations 420, 421, 422, and 423 within the first sub-area 412 could all be part of a freight train transportation network, locations 423, 424, 425, and 426 within the second sub-area 414 could all be part of a domestic airline transportation network, and locations 426, 427, and 430 within the third sub-area 416 could all be part of a freight train transportation network. As illustrated by these three sub-areas, a given location could be part of two or more transportation networks. For example, location 423 could be part of the freight train transportation network and the domestic airline transportation network (e.g., it could have both a freight train terminal and an airport, and thus serve as a location that supports transitioning between the different transportation networks).

In the example depicted in FIG. 4, the pre-processing operations have identified a number of possible routes. The possible routes are identified by dynamically generating representations of one or more transportation networks using those locations that are within the geographic area 410 and/or the sub-areas 412, 414, and 416. For example, the transportation services of each of the locations within the geographic area and/or sub-areas can be analyzed. Possible routes can then be built up using locations that have overlapping transportation services. For example, origin location 420 may be part of a freight train transportation network. The other locations within the geographic area 410 can be examined to determine which of them are also part of the freight train transportation network. For example, location 421 can be part of the freight train transportation network and have a connection 450 (e.g., one or more railway lines) to origin location 420, location 423 can be part of the freight train transportation network and have a connection 452 to location 421, and so on. Using the locations within the geographic area 410 and the transportation services associated with the locations, the possible routes can be generated, as reflected by the lines with arrows in FIG. 4. The sub-areas can be determined using a similar procedure. For example, if origin location 420 is part of the freight train transportation network, then the connected locations can be followed to determine the sub-area that supports possible routes using the freight train transportation network (in this example, the first sub-area 412). In this example, location 423 is identified as the ending location for the first sub-area 412 (e.g., location 423 is not connected to other locations via the freight train transportation network or there are other transportation requirements that indicate location 423 is the ending location, such as the customer order specifying a switch to an airline network).

In some implementations, the locations within the geographic area 410 and/or sub-areas 412, 414, and 416 are filtered based on one or more transportation requirements. For example, the locations can be filtered based on one or more transportation requirements that are specified by the customer order and/or from another source (e.g., transportation preferences provided by the customer). For example, the specific possible routes depicted in FIG. 4 could be the result of the customer order specifying that a freight train transportation network and a domestic airline transportation networks should be used. Taking these transportation requirements into account, the pre-processing operations would filter the locations so that only those locations within the geographic are 410 that are part of the freight train transportation network or the domestic airline transportation network are considered. In this example, locations 440, 441, 442, 443, 444, 445, and 446 are not part of the freight train or domestic airline transportation networks and therefore they are excluded from consideration.

In some implementations, the possible routes within a given sub-area only use one transportation network. For example, sub-area 412 uses only a freight train transportation network, sub-area 414 uses only a domestic airline transportation network, and sub-area 416 uses only an international airline transportation network. Furthermore, the locations within a given sub-area can be filtered so that only those locations that are part of the transportation network being used for the given sub-area are considered. For example, if the second sub-area 414 is using a domestic airline transportation network, and location 441 is not part of the domestic airline transportation network, it can be excluded from consideration for possible routes. It should be understood that some locations can be part of more than one transportation network.

In some implementations, the locations that are available for use within the geographic area 410 and/or sub-areas 412, 414, and 416 when determining the possible routes can be filtered based on other transportation requirements. For example, a freight train transportation network can have specific requirements regarding locomotives, crews, etc. Other transportation networks can have specific requirements as well.

In some situations, the origin location 420 and destination location 430 may represent the actual start and end points for the shipment. However, in other situations, there may be other modes of transportation either before the origin location 420 and/or after the destination location 430. For example, the shipment could actually begin in the same city as the origin location 420 (e.g., at an arbitrary location within the city) or at another location (e.g., an arbitrary location outside the geographic area 410) and arrive at the origin location 420 via a different transportation network (e.g., a trucking network that picks up goods from an arbitrary location within the same city as the origin location 420 or from an arbitrary location at another city and delivers the goods to a freight train terminal that is part of the transportation network being used within the geographic area 410). A similar situation can occur at the destination location 430.

In some implementations, the initial geographic area (e.g., geographic area 410) is analyzed to determine if it contains at least one possible route from the origin location 420 to the destination location 430 using only those locations within the initial geographic area. If it does, then the pre-processing operations proceed using the initial geographical area. If not, then the initial geographic area is incrementally increased in size until it does contain at least one route from the origin location to the destination location. A similar procedure can be used when determining the sub-areas.

In some implementations, the possible routes are determined within one or more transportation networks that have schedules (also referred to as defined schedules), which is the case with the example depicted in FIGS. 3 and 4. Transportation networks that have schedules include train networks, airline networks, ocean shipping networks, and other transportation networks with defined schedules. Transportation networks with schedules have established connections (e.g., route stages) between established locations (e.g., airline routes between various airport locations). Transportation networks with schedules do not include modes of transport that do not have schedules and/or that do not travel between established locations. For example, a trucking network that provides pickup and/or delivery services to arbitrary locations (e.g., customer business addresses) is not a transportation network with a schedule.

Methods for Determining Possible Routes Using Pre-Processing Operations

In the technologies described herein, methods can be provided for determining possible routes using pre-processing operations. For example, hardware and/or software elements can perform operations to determine possible routes and/or optimized routes. For example, the determination can be performed by a route pre-processor (e.g., route pre-processor 110) and/or a route optimizer (e.g., route optimizer 120).

Figure 5:
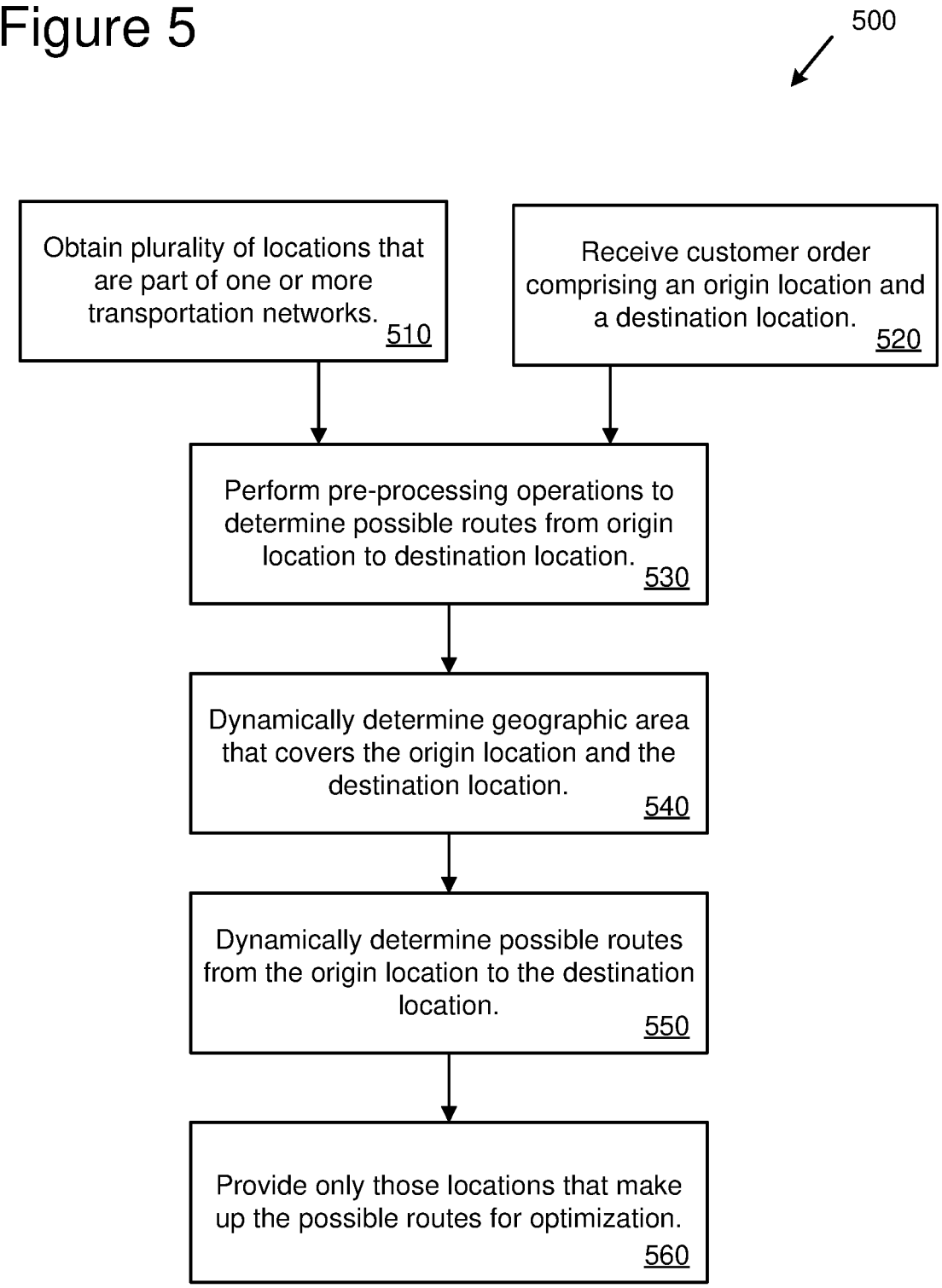
FIG. 5 is a is a flowchart of an example method for determining possible routes using pre-processing operations.

FIG. 5 is a flowchart depicting an example process 500 for determining possible routes using pre-processing operations. In some implementations, a route pre-processor and/or a route optimizer is programmed with computer instructions to implement an algorithm as described by FIG. 5.

At 510, a plurality of geographic locations are obtained, where the plurality of locations are part of one or more transportation networks. In addition, each location is associated with a set of transportation services (e.g., defining which transportation network or networks are available at the location and/or other transportation service information). In some implementations, the plurality of locations is obtained as a data set (e.g., comprising location tuples defining pairs of adjacent locations of the same transportation network).

At 520, a customer order is received. The customer order comprises transportation requirements. The transportation requirements comprise an origin location and a destination location. Other transportation requirements can be specified by the customer order, such as indications of one or more transportation networks to use for the customer order, a drop-off time, an arrival time, and/or a transit time. As depicted in FIG. 5, operations 510 and 520 can be independent operations. However, in some implementations, operations 510 and 520 can be performed in a different order (e.g., one or the other can be performed first). For example, operation 520 could be performed and the results used for operation 510 (e.g., the plurality of locations could be obtained based on the customer order, such as based on the transportation requirements, origin location, destination location, and/or other attributes of the customer order).

At 530, pre-processing operations are performed to determine possible routes from the origin location to the destination location. The pre-processing operations determine the possible routes by dynamically generating representations of the transportation networks at runtime (e.g., without utilizing transportation schedules and without considering capacity, cost, or time transportation requirements).

At 540, the pre-processing operations comprise dynamically determining, at runtime, a geographic area that covers the origin location and the destination location. The geographic area includes only those locations that are within the geographic area (and not those locations that are outside the geographic area). In some implementations, the locations within the geographic area are filtered (e.g., based on transportation requirements), in which case it is the filtered locations that are used when determining the possible routes. In some implementations, the geographic area is divided into multiple geographic sub-areas, and it is the locations within the sub-areas that are used when determining the possible routes.

At 550, the pre-processing operations comprise dynamically determining, at runtime, possible routes from the origin location to the destination location. The possible routes are determined as those routes that could satisfy the customer order and that use at least one of the transportation networks. The possible routes are identified by the locations that make up the possible routes (e.g., as a set of location tuples or in another format). In some implementations, the possible routes are identified by a sequence of location tuples, each location tuple representing a stage of two adjacent locations associated with a given transportation network.

At 560, only those locations that make up the possible routes are provided for route optimization. For example, the locations that make up the possible routes (e.g., in the format of sets of location tuples) can be provided to a route optimizer. During route optimization, one or more optimized routes are determined using the provided locations. Route optimization is performed using additional transportation requirements (additional to those used when determining the possible routes) as well as transportation schedules. In some implementations, static definitions of the transportation networks (e.g., comprising the transportation schedules and other information defining the transportation networks) are used when determining the optimized routes. The optimized routes can be output (e.g., provided to a customer, displayed in a computer user interface, saved to a file or database, etc.).

Figure 6:
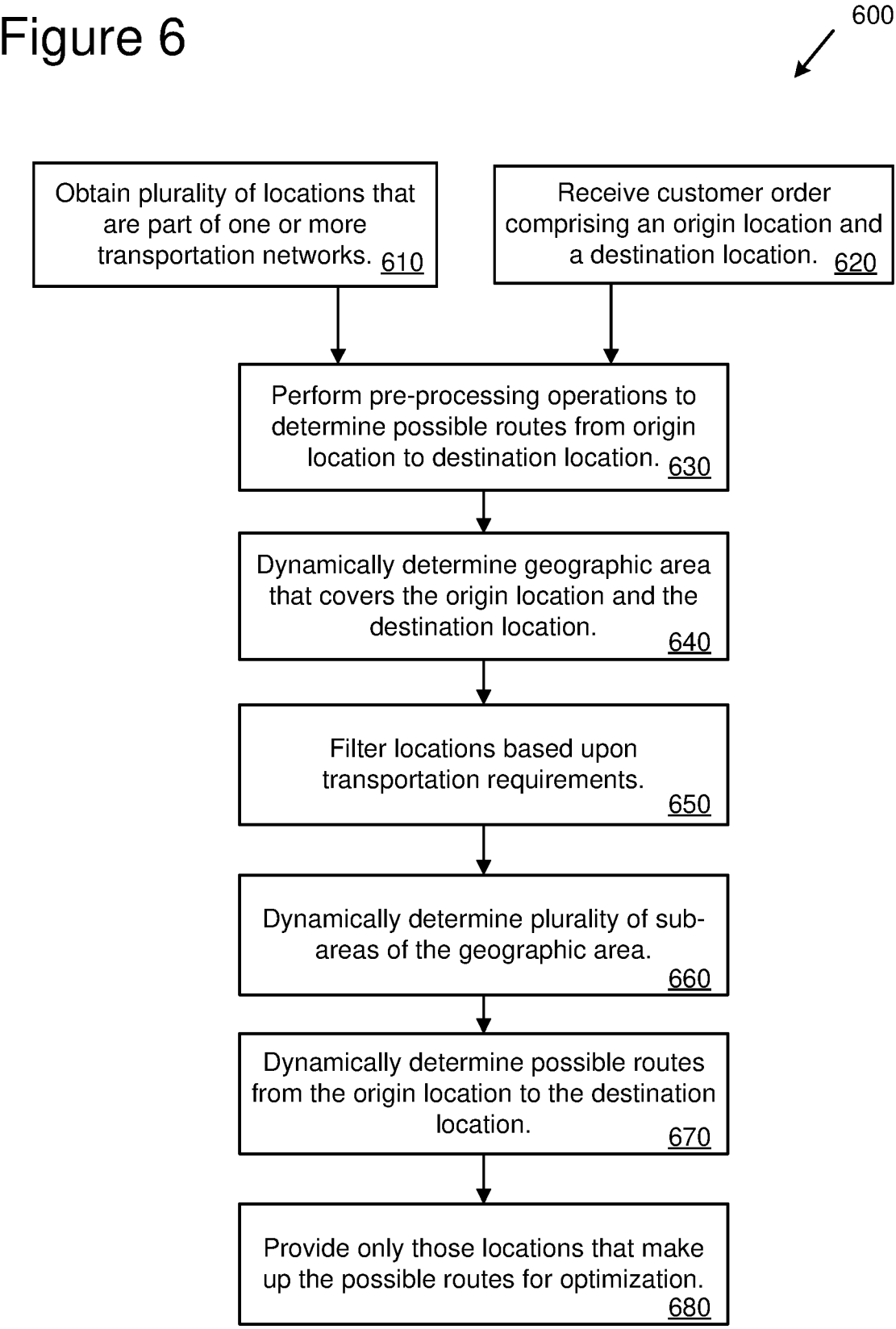
FIG. 6 is a is a flowchart of an example method for determining possible routes using pre-processing operations, including determining geographic sub-areas.

FIG. 6 is a flowchart depicting an example process 600 for determining possible routes using pre-processing operations, including determining geographic sub-areas. In some implementations, a route pre-processor and/or a route optimizer is programmed with computer instructions to implement an algorithm as described by FIG. 6.

At 610, a plurality of geographic locations are obtained, where the plurality of locations are part of one or more transportation networks. In addition, each location is associated with a set of transportation services (e.g., defining which transportation network or networks are available at the location and/or other transportation service information). In some implementations, the plurality of locations is obtained as a data set (e.g., comprising location tuples defining pairs of adjacent locations of the same transportation network).

At 620, a customer order is received. The customer order comprises transportation requirements. The transportation requirements comprise an origin location and a destination location. Other transportation requirements can be specified by the customer order, such as indications of one or more transportation networks to use for the customer order, a drop-off time, an arrival time, and/or a transit time. As depicted in FIG. 6, operations 610 and 620 can be independent operations. However, in some implementations, operations 610 and 620 can be performed in a different order (e.g., one or the other can be performed first). For example, operation 620 could be performed and the results used for operation 610 (e.g., the plurality of locations could be obtained based on the customer order, such as based on the transportation requirements, origin location, destination location, and/or other attributes of the customer order).

At 630, pre-processing operations are performed to determine possible routes from the origin location to the destination location. The pre-processing operations determine the possible routes by dynamically generating representations of the transportation networks at runtime (e.g., without utilizing transportation schedules and without considering capacity, cost, or time transportation requirements).

At 640, the pre-processing operations comprise dynamically determining, at runtime, a geographic area that covers the origin location and the destination location. The geographic area includes only those locations that are within the geographic area (and not those locations that are outside the geographic area).

At 650, the pre-processing operations comprise dynamically filtering, at runtime, the locations based at least in part upon transportation requirements. For example, the locations within the geographic area, and/or within sub-areas, can be filtered so that only those that provide specific transportation services (e.g., are part of one or more specific transportation networks) are retained and used when determining the possible routes.

At 660, the pre-processing operations comprise dynamically determining, at runtime, a plurality of sub-areas of the geographic area. The plurality of sub-areas are in a sequence from the origin location to the destination location. Furthermore, the locations within each sub area are part of the same transportation network.

At 670, the pre-processing operations comprise dynamically determining, at runtime, possible routes from the origin location to the destination location through the sub-areas. The possible routes are determined as those routes that could satisfy the customer order and that use at least one of the transportation networks. The possible routes are identified by the locations that make up the possible routes (e.g., as a set of location tuples or in another format). In some implementations, the possible routes are identified by a sequence of location tuples, each location tuple representing a stage of two adjacent locations associated with a given transportation network.

At 680, only those locations that make up the possible routes are provided for route optimization. For example, the locations that make up the possible routes (e.g., in the format of sets of location tuples) can be provided to a route optimizer. During route optimization, one or more optimized routes are determined using the provided locations. Route optimization is performed using additional transportation requirements (additional to those used when determining the possible routes) as well as transportation schedules. In some implementations, static definitions of the transportation networks (e.g., comprising the transportation schedules and other information defining the transportation networks) are used when determining the optimized routes. The optimized routes can be output (e.g., provided to a customer, displayed in a computer user interface, saved to a file or database, etc.).

The pre-processing operations determine the possible routes between two locations (e.g., from an origin location to a destination location) by dynamically generating representations of the transportation networks at runtime. For example, the pre-processing operations may only consider some locations in dynamically generating a representation of a given transportation network (e.g., based on geographic area and/or sub-areas, transportation requirements, services, without regard to transportation schedules, without regard to capacity, and/or other criteria). In some implementations, this means that the pre-processing operations only consider individual location definitions that indicate the transportation services available at a given location as well as which other location(s) are connected to the given location (e.g., indicated by location tuples). In some implementations, this also means that the pre-processing operations do not consider capacity or time transportation requirements (e.g., the pre-processing operations do not take into account the specific transportation vehicles used by the transportation networks, their capacities, and their schedules).

Computing Systems

Figure 7:
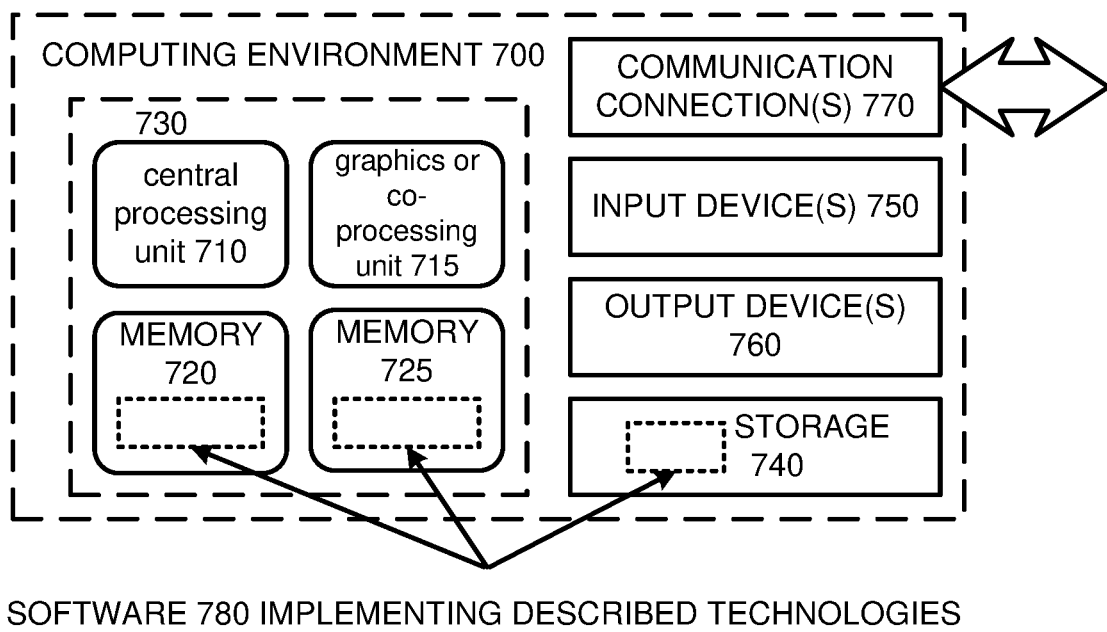
FIG. 7 is a diagram of an example computing system in which some described embodiments can be implemented.

FIG. 7 depicts a generalized example of a suitable computing system 700 in which the described innovations may be implemented. The computing system 700 is not intended to suggest any limitation as to scope of use or functionality, as the innovations may be implemented in diverse general-purpose or special-purpose computing systems.

With reference to FIG. 7, the computing system 700 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s). The memory 720, 725 stores software 780 implementing one or more innovations described herein, in the form of computer-executable instructions suitable for execution by the processing unit(s).

A computing system may have additional features. For example, the computing system 700 includes storage 740, one or more input devices 750, one or more output devices 760, and one or more communication connections 770. An interconnection mechanism (not shown) such as a bus, controller, or network interconnects the components of the computing system 700. Typically, operating system software (not shown) provides an operating environment for other software executing in the computing system 700, and coordinates activities of the components of the computing system 700.

The tangible storage 740 may be removable or non-removable, and includes magnetic disks, magnetic tapes or cassettes, CD-ROMs, DVDs, or any other medium which can be used to store information in a non-transitory way and which can be accessed within the computing system 700. The storage 740 stores instructions for the software 780 implementing one or more innovations described herein.

The input device(s) 750 may be a touch input device such as a keyboard, mouse, pen, or trackball, a voice input device, a scanning device, or another device that provides input to the computing system 700. For video encoding, the input device(s) 750 may be a camera, video card, TV tuner card, or similar device that accepts video input in analog or digital form, or a CD-ROM or CD-RW that reads video samples into the computing system 700. The output device(s) 760 may be a display, printer, speaker, CD-writer, or another device that provides output from the computing system 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Cloud Computing Environment

Figure 8:
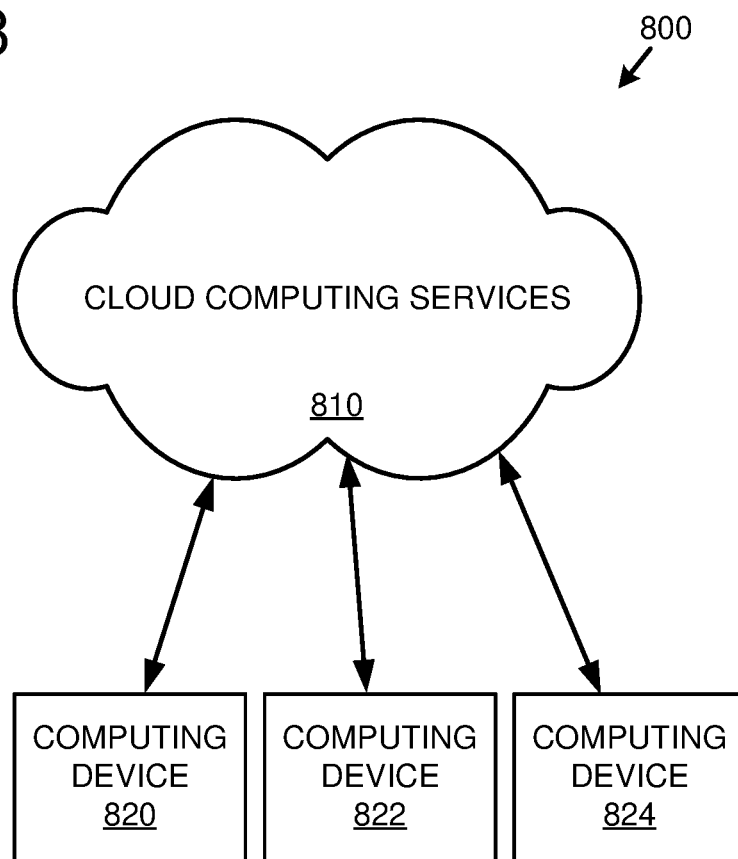
FIG. 8 is an example cloud computing environment that can be used in conjunction with the technologies described herein.

FIG. 8 depicts an example cloud computing environment 800 in which the described technologies can be implemented. The cloud computing environment 800 comprises cloud computing services 810. The cloud computing services 810 can comprise various types of cloud computing resources, such as computer servers, data storage repositories, database resources, networking resources, etc. The cloud computing services 810 can be centrally located (e.g., provided by a data center of a business or organization) or distributed (e.g., provided by various computing resources located at different locations, such as different data centers and/or located in different cities or countries).

The cloud computing services 810 are utilized by various types of computing devices (e.g., client computing devices), such as computing devices 820, 822, and 824. For example, the computing devices (e.g., 820, 822, and 824) can be computers (e.g., desktop or laptop computers), mobile devices (e.g., tablet computers or smart phones), or other types of computing devices. For example, the computing devices (e.g., 820, 822, and 824) can utilize the cloud computing services 810 to perform computing operators (e.g., data processing, data storage, and the like).

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (i.e., any available computing device, including smart phones or other mobile devices that include computing hardware). Computer-readable storage media are tangible media that can be accessed within a computing environment (one or more optical media discs such as DVD or CD, volatile memory (such as DRAM or SRAM), or nonvolatile memory (such as flash memory or hard drives)). By way of example and with reference to FIG. 7, computer-readable storage media include memory 720 and 725, and storage 740. The term computer-readable storage media does not include signals and carrier waves. In addition, the term computer-readable storage media does not include communication connections, such as 770.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A method, performed by one or more computing devices, for determining possible routes using pre-processing operations, the method comprising:

obtaining a plurality of geographic locations, wherein each location is associated with a set of transportation services, and wherein each location is part of one or more transportation networks;

receiving a customer order, wherein the customer order comprises transportation requirements, the transportation requirements comprising an origin location and a destination location;

performing pre-processing operations for determining possible routes from the origin location to the destination location, wherein the pre-processing operations determine the possible routes by dynamically generating representations of the transportation networks at runtime, the pre-processing operations comprising:

dynamically determining, at runtime, a geographic area that covers the origin location and the destination location, wherein the geographic area includes only those locations that are within the geographic area; and dynamically determining, at runtime, possible routes from the origin location to the destination location within the geographic area that satisfy the customer order and that use at least one of the transportation networks, and wherein the possible routes are identified by those locations within geographic area that make up the possible routes; and sending only those locations within the geographic area that make up the possible routes for route optimization, wherein one or more optimized routes are determined using only those locations within the geographic area that make up the possible routes, one or more additional transportation requirements, and one or more transportation schedules, wherein dynamically determining, at runtime, the geographic area comprises:
   initially defining the geographic area to be a smallest rectangular area encompassing both the origin location and the destination location; and
   responsive to finding that the geographic area does not contain a possible route from the origin location to the destination location using only those locations within the geographic area, incrementally increasing size of the geographic area until the geographic area contains at least one possible route from the origin location to the destination location using only those locations within the geographic area.

2. The method of claim 1, wherein the pre-processing operations determine the possible routes without utilizing the one or more transportation schedules and without considering capacity, cost, or time requirements.

3. The method of claim 1, wherein the transportation requirements further comprises indications of one or more transportation networks to use for the customer order.

4. The method of claim 1, wherein the transportation requirements further comprises one or more of:
   a drop-off time;
   an arrival time; or
   a transit time.

5. The method of claim 1, wherein the one or more optimized routes are determined by utilizing, at least in part, static definitions for the transportation networks, including the one or more transportation schedules.

6. The method of claim 1, wherein at least one of the locations is part of two or more different transportation networks.

7. The method of claim 1, wherein the possible routes are identified by a sequence of location tuples, each location tuple representing a stage of two adjacent locations associated with a given transportation network.

8. The method of claim 1, the pre-processing operations further comprising:
   filtering the locations within the geographic area to remove locations that do not meet at least one or more of the transportation requirements;
   wherein the dynamically, at runtime, determining the possible routes uses the filtered locations.

9. The method of claim 1,
   wherein the pre-processing operations further comprise dynamically determining, at runtime, a plurality of sub-areas of the geographic area, wherein the plurality of sub-areas are in a sequence from the origin location to the destination location, and wherein locations within each sub area have one or more transportation services in common;
   wherein the possible routes are determined for each sub-area;
   wherein the locations that are sent for route optimization are for each sub-area; and
   wherein each sub-area uses a single transportation network, wherein the single transportation network of each sub-area is different from transportation networks used in adjacent sub-areas.

10. The method of claim 9, wherein dynamically determining, at runtime, a plurality of sub-areas of the geographic area comprises incrementally enlarging the sub-areas so that they include at least one possible route.

11. The method of claim 1, wherein the customer order is for a shipment of goods from the origin location to the destination location, and wherein a route optimizer outputs the optimized routes.

12. One or more computing devices comprising:
processors; and
memory;
the one or more computing devices configured, via computer-executable instructions, to perform operations for determining possible routes using pre-processing operations, the operations comprising:
   obtaining a plurality of geographic locations, wherein each location is associated with a set of transportation services, and wherein each location is part of one or more transportation networks;
   receiving a customer order, wherein the customer order comprises transportation requirements, the transportation requirements comprising an origin location and a destination location;
   performing pre-processing operations for determining possible routes from the origin location to the destination location, wherein the pre-processing operations determine the possible routes by dynamically generating representations of the transportation networks at runtime, the pre-processing operations comprising:
      dynamically determining, at runtime, a geographic area that covers the origin location and the destination location;
      filtering locations within the geographic area based at least in part on the transportation requirements;
      dynamically determining, at runtime, a plurality of sub-areas of the geographic area, wherein the plurality of sub-areas are in a sequence from the origin location to the destination location, and wherein locations within each sub area are part of a same transportation network;
      for each sub-area, determining possible routes within the sub-area that satisfy the customer order, wherein the possible routes are identified by those locations within the sub-area that make up the possible routes;
   sending only those locations that make up the possible routes for each sub-area for route optimization, wherein one or more optimized routes are determined using only those locations that make up the possible routes for each sub-area, one or more additional transportation requirements, and one or more transportation schedules,
   wherein dynamically determining, at runtime, the geographic area comprises:
      initially defining the geographic area to be a smallest rectangular area encompassing both the origin location and the destination location; and
      responsive to finding that the geographic area does not contain a possible route from the origin location to the destination location using only those locations within the geographic area, incrementally increasing size of the geographic area until the geographic area contains at least one possible route from the origin location to the destination location using only those locations within the geographic area.

13. The one or more computing devices of claim 12, wherein the pre-processing operations determine the possible routes without utilizing the one or more transportation schedules and without considering capacity, cost, or time requirements.

14. The one or more computing devices of claim 12, wherein the transportation requirements further comprise indications of one or more transportation networks to use for the customer order and/or indications of one or more modes of transportation to use for the customer order.

15. The one or more computing devices of claim 12, wherein the one or more optimized routes are determined by utilizing, at least in part, static definitions for the transportation networks, including the one or more transportation schedules.

16. The one or more computing devices of claim 12, wherein at least one of the locations is part of two or more different transportation networks.

17. The one or more computing devices of claim 12, wherein, for each sub-area:
the transportation network for the sub-area is different from transportation networks used in adjacent sub-areas.

18. The one or more computing devices of claim 12, wherein the customer order is for a shipment of goods from the origin location to the destination location.

19. One or more computer-readable storage media storing computer-executable instructions for execution on one or more computing devices to perform operations, the operations comprising:
obtaining a data set defining a plurality of geographic locations, wherein each location is associated with a set of transportation services, and wherein each location is part of one or more transportation networks;
receiving a customer order, wherein the customer order comprises transportation requirements, the transportation requirements comprising an origin location and a destination location;
performing pre-processing operations for determining possible routes from the origin location to the destination location, wherein the pre-processing operations determine the possible routes without utilizing static definitions for the transportation networks by dynamically generating representations of the transportation networks at runtime, the pre-processing operations comprising:
dynamically determining, at runtime, a geographic area that covers the origin location and the destination location;
filtering locations within the geographic area based at least in part on the transportation requirements;
dynamically determining, at runtime, a plurality of sub-areas of the geographic area, wherein the plurality of sub-areas are in a sequence from the origin location to the destination location, and wherein locations within each sub area are part of a same transportation network; and
for each sub-area, determining possible routes within the sub-area that satisfy the customer order, wherein the possible routes are identified by those locations within the sub-area that make up the possible routes; and sending only those locations that make up the possible routes for each sub-area for route optimization, wherein one or more optimized routes are determined using only those locations that make up the possible routes for each sub-area, one or more additional transportation requirements, and one or more transportation schedules, wherein dynamically determining, at runtime, the geographic area comprises:
initially defining the geographic area to be a smallest rectangular area encompassing both the origin location and the destination location; and
responsive to finding that the geographic area does not contain a possible route from the origin location to the destination location using only those locations within the geographic area, incrementally increasing size of the geographic area until the geographic area contains at least one possible route from the origin location to the destination location using only those locations within the geographic area.

20. The one or more computer-readable storage media of claim 19, wherein the pre-processing operations determine the possible routes without utilizing transportation schedules for the transportation networks and without considering capacity, cost, or time requirements.

21. The one or more computer-readable storage media of claim 19, wherein, for each sub-area:
the transportation network for the sub-area is different from transportation networks used in adjacent sub-areas.

* * * * *